US012746771B2

(12) United States Patent
Bungert

(10) Patent No.: US 12,746,771 B2
(45) Date of Patent: Sep. 29, 2026

(54) RETRANSFER PRINTING WITH NON-LINEAR PEEL-OFF

(71) Applicant: Entrust Corporation, Shakopee, MN (US)

(72) Inventor: Lyle Bungert, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 127 days.

(21) Appl. No.: 18/456,778

(22) Filed: Aug. 28, 2023

(65) Prior Publication Data

US 2024/0066904 A1 Feb. 29, 2024

Related U.S. Application Data

(60) Provisional application No. 63/373,799, filed on Aug. 29, 2022.

(51) Int. Cl.
*B41J 33/04* (2006.01)
*B41J 3/407* (2006.01)
(Continued)

(52) U.S. Cl.
CPC ............. *B41J 33/04* (2013.01); *B41J 3/4075* (2013.01); *B41J 35/16* (2013.01); *B41J 35/30* (2013.01)

(58) Field of Classification Search
CPC ... B41J 33/04; B41J 35/16; B41J 35/30; B41J 3/4075; B41J 2/32; B41J 2/315;
(Continued)

(56) References Cited

U.S. PATENT DOCUMENTS 4,825,054 A 4/1989 Rust et al.
4,995,501 A 2/1991 Lundstrom et al.
(Continued)

FOREIGN PATENT DOCUMENTS

EP 1468831 9/2007
EP 2978611 2/2017
(Continued)

OTHER PUBLICATIONS

International Search Report and Written Opinion for PCT Application No. PCT/IB2023/058496, Dec. 1, 2023, 10 pages.
(Continued)

*Primary Examiner* — Kristal Feggins
(74) *Attorney, Agent, or Firm* — MERCHANT & GOULD P.C.

(57) ABSTRACT

A retransfer printing method and system where the peel-off of the print receptive material from the retransfer film is improved. The peeling-off or removal of the print receptive material from the retransfer film is improved by adhering the peel-off adhesive material to the print receptive material along a non-straight, non-linear leading edge and/or a non-straight, non-linear trailing edge along which the print receptive material is to be removed from the retransfer film. The use of the non-straight, non-linear leading edge and/or trailing edge helps to manage mechanical and thermal stresses and eliminates tears that may occur in the ribbon when the print receptive material is peeled from the retransfer film by the ribbon.

17 Claims, 9 Drawing Sheets

(51) Int. Cl.
*B41J 35/16* (2006.01)
*B41J 35/30* (2006.01)

(58) Field of Classification Search
CPC ....... B41J 2/325; B41F 16/00; B41F 16/0006; B41F 16/0026; B41F 16/0033
See application file for complete search history.

(56) References Cited

U.S. PATENT DOCUMENTS

| | | | | |
|---|---|---|---|---|
| 5,266,781 | A | 11/1993 | Warwick et al. | |
| 5,837,991 | A | 11/1998 | LaManna et al. | |
| 6,131,817 | A | 10/2000 | Miller | |
| 6,783,067 | B2 | 8/2004 | Kreuter et al. | |
| 6,902,107 | B2 | 6/2005 | Shay et al. | |
| 7,119,823 | B2 | 10/2006 | Takahashi et al. | |
| 7,398,972 | B2 | 7/2008 | Schuller et al. | |
| 7,434,728 | B2 | 10/2008 | Paulson et al. | |
| 9,802,398 | B2 | 10/2017 | Rieck et al. | |
| 10,105,981 | B2 | 10/2018 | Broberg et al. | |
| 10,828,885 | B2 | 11/2020 | Cronin | |
| 2007/0187870 | A1 | 8/2007 | Lundstrom et al. | |
| 2015/0217549 | A1* | 8/2015 | Rieck | B41M 5/38207 156/230 |
| 2018/0104963 | A1* | 4/2018 | Benton | B41J 2/325 |
| 2018/0370220 | A1 | 12/2018 | Cronin | |

FOREIGN PATENT DOCUMENTS

| | | |
|---|---|---|
| EP | 1342584 | 3/2023 |
| JP | 2004330782 | 11/2004 |
| JP | 2019098539 | 6/2019 |
| WO | 2020241159 | 12/2020 |

OTHER PUBLICATIONS

European Office Action received for EP Application No. 23859577, mailed Jul. 14, 2026, 8 pages.

* cited by examiner

RETRANSFER PRINTING WITH NON-LINEAR PEEL-OFF

FIELD

This technical disclosure relates to retransfer printing on personalized credentials such as plastic cards.

BACKGROUND

Retransfer printing is a well-known printing process for printing on plastic cards. In one known implementation, printing is performed on a print receptive layer of a retransfer film in a print station, typically in multiple print passes with each print pass printing a different color onto the print receptive layer. When printing is complete, the retransfer film containing the printing is advanced to a transfer station and the portion of the print receptive layer that contains the printing is transferred to the surface of a plastic card-shaped substrate.

During retransfer printing on plastic cards, it is sometimes desirable to prevent transfer of the print receptive layer from the retransfer film to one or more locations on the surface of the plastic card. For example, one may wish to prevent transfer of the print receptive layer over a signature panel on the card, over a location of a magnetic strip on the card, and/or over the location of an integrated circuit chip on the card. One technique for preventing transfer of print receptive material is commonly called peel-off. In peel-off, the print ribbon used to print the image onto the print receptive material of the retransfer film includes adhesive panels (referred to generally as peel-off panels) and the print head of the printer is controlled to adhere the adhesive to the print receptive material at a location corresponding to the location on the card surface that one does not want to cover with the print receptive material. Thereafter, when the print ribbon is separated from the retransfer film, the adhesive removes or peels-off a portion of the print receptive material at the location(s) that is not to be transferred to the card surface.

SUMMARY

A retransfer printing method and system are described where the peel-off of the print receptive material from the retransfer film is improved. In particular, the peeling-off or removal of the print receptive material from the retransfer film is improved by adhering the adhesive material of the peel-off panel to the print receptive material along a non-straight, non-linear leading edge and/or a non-straight, non-linear trailing edge along which the print receptive material is to be removed from the retransfer film. The use of the non-straight, non-linear leading edge and/or trailing edge helps to manage mechanical and thermal stresses and eliminates tears that may occur in the print ribbon (and possibly in the retransfer film) when the print receptive material is peeled from the retransfer film by the print ribbon.

However, the peel-off concept described herein is not limited to peel-off of print receptive material in retransfer printing. Rather, the peel-off concept described herein can be used in any personalized credential processing or personalization operation where an area of material may need to be removed from a larger layer of material. For example, the peel-off concept described herein can be used to remove an area of inhibitor material from an inhibitor panel on a thermal transfer print ribbon in a direct-to-card printing process, or used to remove an area of topcoat material from a larger section of topcoat material in a direct-to-card printing process.

The leading edge can be non-straight, the trailing edge can be non-straight, or both the leading edge and the trailing edge can be non-straight. In an embodiment, the leading edge and/or the trailing edge can be adhered along a non-linear repeating or random pattern. In one embodiment, the non-linear repeating or random pattern may be configured as, and referred to as, a toothed pattern, a crenellated pattern, a saw-tooth pattern, or a pattern with a plurality of projections separated from one another by indentations. However, other patterns are possible. In another embodiment, the leading edge and the trailing edge can be non-linear and can be interconnected by side edges that are parallel to one another.

A retransfer printing method on a personalized credential comprises printing data within an image canvas of transferrable print receptive material on a retransfer film by aligning thermally transferrable color material on a ribbon with the image canvas and transferring thermally transferrable color material from the ribbon onto at least a portion of the transferrable print receptive material within the image canvas using a thermal print head. After printing the data, peel-off material on a ribbon is aligned with the image canvas of the transferrable print receptive material on the retransfer film, and a portion of the peel-off material is adhered to a peel-off area of the transferrable print receptive material within the image canvas using a thermal print head, wherein the adhered portion of the peel-off material has a leading edge with a non-linear repeating or random pattern. The transferrable print receptive material within the peel-off area is then peeled from the retransfer film thereby forming a void area in the transferrable print receptive material of the image canvas. The retransfer film and the printed data of the image canvas are then advanced to a transfer station, and a portion of the image canvas of the transferrable print receptive material bearing the printed data and the void area is transferred to a surface of the personalized credential.

In another embodiment, a retransfer printing method on a plastic card comprises overlapping a print ribbon and a retransfer film in a print station having a thermal print head, where the print ribbon has a repeating sequence of panels of thermally transferrable material, with each sequence of panels including at least one panel of thermally transferrable color material followed by at least one panel of peel-off material, and the retransfer film having a layer of transferrable print receptive material. Data is then printed within an image canvas of the transferrable print receptive material by aligning the at least one panel of thermally transferrable color material with the image canvas and transferring thermally transferrable color material from the at least one panel of thermally transferrable color material onto at least a portion of the transferrable print receptive material within the image canvas using the thermal print head. After printing the data, the at least one panel of peel-off material of the print ribbon is aligned with the image canvas of the transferrable print receptive material of the retransfer film, and a portion of the peel-off material of the at least one panel of peel-off material is adhered to a peel-off area of the transferrable print receptive material within the image canvas using the thermal print head, wherein the adhered portion of the peel-off material has a leading edge with a non-linear repeating or random pattern. The print ribbon is then separated from the retransfer film to peel the transferrable print receptive material within the peel-off area from the retransfer film thereby forming a void area in the transferrable print receptive material of the image canvas. The retransfer film along with the printed data of the image canvas are then advanced to a transfer station, and a portion of the image canvas of the transferrable print receptive material bearing the printed data and the void area is transferred to a surface of the plastic card.

A retransfer print station of a personalized credential processing system that can perform the methods described herein can include a thermal print head, a retransfer film having a layer of transferrable print receptive material, a ribbon having a peel-off material, a transfer station, and a controller that is programmed to control the thermal print head, the retransfer film, the ribbon and the transfer station to: align the peel-off material of the ribbon with an image canvas of the transferrable print receptive material of the retransfer film having printed data in the image canvas, and adhere a portion of the peel-off material to a peel-off area of the transferrable print receptive material within the image canvas using the thermal print head, wherein the adhered portion of the peel-off material has a leading edge with a non-linear repeating or random pattern; peel the transferrable print receptive material within the peel-off area from the retransfer film thereby forming a void area in the transferrable print receptive material of the image canvas; and advance the retransfer film and the printed data of the image canvas to a transfer station, and transfer a portion of the image canvas of the transferrable print receptive material bearing the printed data and the void area to a surface of the personalized credential.

In another embodiment, a retransfer print station of a plastic card processing system that can perform the method described herein comprises a thermal print head, a retransfer film having a layer of transferrable print receptive material, a print ribbon having a repeating sequence of panels of thermally transferrable material with each sequence of panels including at least one panel of thermally transferrable color material followed by at least one panel of peel-off material, a transfer station, and a controller. The controller is programmed to control the thermal print head, the retransfer film, the print ribbon, and the transfer station to:

- print data within an image canvas of the transferrable print receptive material by aligning the at least one panel of thermally transferrable color material with the image canvas and transferring thermally transferrable color material from the at least one panel of thermally transferrable color material onto at least a portion of the transferrable print receptive material within the image canvas using the thermal print head;
- align the at least one panel of peel-off material of the print ribbon with the image canvas of the transferrable print receptive material of the retransfer film, and adhere a portion of the peel-off material of the at least one panel of peel-off material to a peel-off area of the transferrable print receptive material within the image canvas using the thermal print head, wherein the adhered portion of the peel-off material has a leading edge with a non-linear repeating or random pattern;
- separate the print ribbon from the retransfer film thereby peeling the transferrable print receptive material within the peel-off area from the retransfer film thereby forming a void area in the transferrable print receptive material of the image canvas; and
- advance the retransfer film and the printed data of the image canvas to a transfer station, and transfer a portion of the image canvas of the transferrable print receptive material bearing the printed data and the void area to a surface of the plastic card.

A personalized credential that results from the retransfer printing method described herein can include a rectangular substrate with a perimeter edge and rounded corners, a first surface, and a second surface opposite the first surface. A personalized credential can include a plastic card, a metal card, a biodegradable card, a polycarbonate page of a passport, and the like. In the case of cards, cardholder data is on at least one of the first surface and the second surface, and the card includes at least one of an integrated circuit chip and a magnetic strip. A print receptive material and a transferrable protective layer covers a portion of the first surface, and a first portion of the first surface is not covered by the print receptive material and the transferrable protective layer. The first portion has a border with at least one edge of the border, such as the leading edge and/or the trailing edge, having a non-linear repeating or random pattern.

DRAWINGS

DETAILED DESCRIPTION

Figure 1:
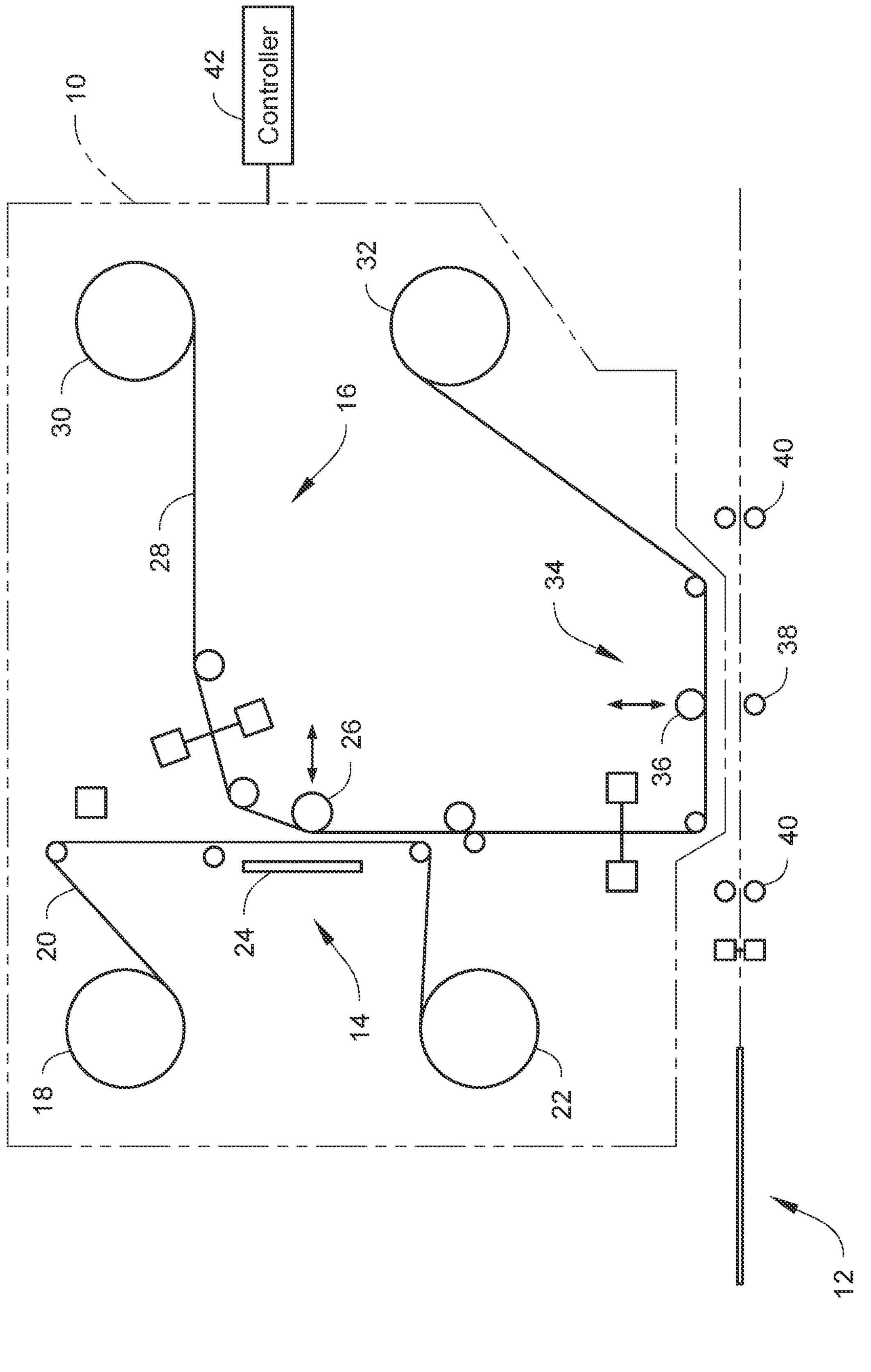
FIG. 1 illustrates a retransfer print station described herein.

Referring to FIG. 1, a retransfer print station 10 is depicted that performs retransfer printing on a personalized credential 12. In retransfer printing, instead of printing directly on the personalized credential, the printing is initially performed on a transferrable material of a retransfer film which is then transferred to the personalized credential 12. Retransfer printing and the general construction of retransfer personalized credential print stations is well known in the art.

Personalized credentials described herein include personalized plastic identification cards (or just plastic cards) and plastic pages of passports, as well as personalized metal cards, and personalized cards formed primarily of a biodegradable material such as one or more biodegradable plastics, paper/cardboard, or other biodegradable material(s). Personalized cards described herein include, but are not limited to, financial (e.g., credit, debit, or the like) cards, access cards, driver's licenses, national identification cards, and business identification cards, and other plastic identification cards that can benefit from having one or more security features described herein added to the plastic card. In an embodiment, the personalized cards may be ID-1 cards as defined by ISO/IEC 7810. However, other card formats such as ID-2 as defined by ISO/IEC 7810 are possible as well. The passport pages can be a front cover or a rear cover of the passport, or an internal page (for example a plastic page referred to as a data page) of the passport. In an embodiment, the passports may be in an ID-3 format as defined by ISO/IEC 7810. The term personalized credential as used herein refers to a credential that has no personalization applied to it and personalization is to be added, as well as to a credential that has some personalization already applied to the credential and additional personalization is to be added.

For sake of convenience in describing the concepts herein, the following description and the drawings describe the personalized credential as being a plastic card. However, as indicated above, the techniques described herein are applicable to plastic pages of passports, personalized metal cards, personalized biodegradable cards, and other personalized cards.

The term "plastic identification document" or "plastic identification card" (or plastic card) as used throughout the specification and claims, unless indicated otherwise, refers to identification documents such as plastic cards where the document substrate can be formed entirely of plastic, or formed of a combination of plastic and non-plastic materials. In one embodiment, the cards can be sized to comply with ISO/IEC 7810 with dimensions of about 85.60 by about 53.98 millimeters (about 3⅜ inxabout 2⅛ in) and rounded corners with a radius of about 2.88-3.48 mm (about ⅛ in). As would be understood by a person of ordinary skill in the art of plastic identification cards, the cards are typically formed of multiple individual layers that form the majority of the card body or the card substrate. Similarly, the term "plastic page" of a passport refers to passport pages where the passport can be formed entirely of plastic, or formed of a combination of plastic and non-plastic materials. An example of a plastic passport page is the data page in a passport containing the personal data of the intended passport holder. The passport page may be a single layer or composed of multiple layers. Examples of plastic materials that the card or passport page, or the individual layers of the card or passport can be formed from include, but are not limited to, polycarbonate, polyvinyl chloride (PVC), polyester, acrylonitrile butadiene styrene (ABS), polyethylene terephthalate glycol (PETG), TESLIN®, combinations thereof, and other plastics.

Returning to FIG. 1, the retransfer print station 10 includes a print side 14 and a retransfer side 16. The print side 14 includes a print ribbon supply 18, a thermal transfer print ribbon 20, a print ribbon take-up 22, a thermal print head 24, and a platen 26. The ribbon supply 18 supplies the thermal transfer print ribbon 20, and the ribbon take-up 22 takes-up used portions of the thermal transfer print ribbon 20 after printing. The print ribbon 20 is transferred along a ribbon path between the ribbon supply 18 and the ribbon take-up 22 past the thermal print head 24 that can be moved toward and away from the opposing platen 26, which may be fixed, to sandwich the print ribbon 20 and the retransfer film therebetween during printing on the retransfer film. Alternatively, the platen 26 can be movable toward and away from the print head 24 which can be stationary.

The retransfer side 16 includes a retransfer film 28 that is supplied from a retransfer film supply 30 and used retransfer film is wound up on a retransfer film take-up 32. The retransfer film 28 follows a path past the print head 24 where printing takes place on the transferrable print receptive material of the retransfer film 28. The retransfer film 28 with the printing thereon is then advanced to a transfer station 34 where the transferrable print receptive material with the printing thereon is transferred from the retransfer film 28 and laminated onto the card 12 using a heated transfer roller 36 and a platen 38. After transferring the transferrable material with the printing, the used retransfer film 28 is wound onto the take-up 32. The card 12 can be transported within the print station 10 using transport rollers 40.

The print station 10 further includes a controller 42 that controls operation of the print station 10. The controller 42 can be dedicated to the retransfer print station 10 so that it controls only the retransfer print station 10, or the controller 42 can be a controller for a larger system that includes the retransfer print station 10 with the controller 42 controlling one or more other systems in addition to the retransfer print station 10. In an embodiment, the controller 42 can be a central processing unit that executes computer program instructions to perform the operations of the retransfer print station 10 described herein.

Figure 2:
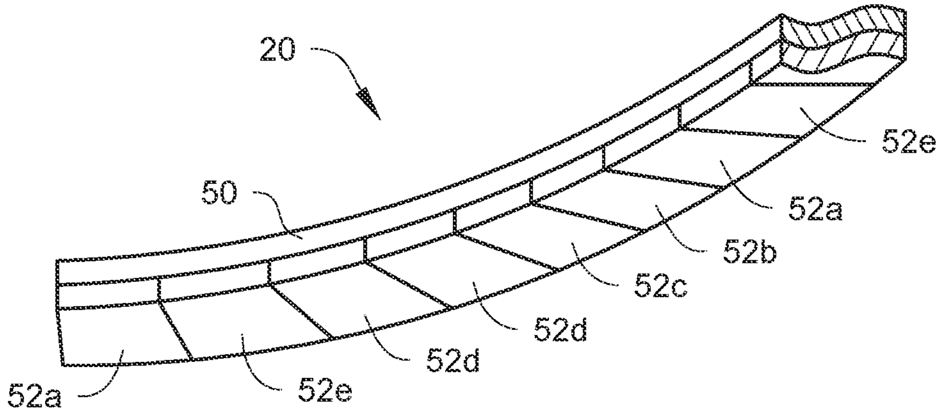
FIG. 2 illustrates an example of a print ribbon that can be used with the retransfer print station of FIG. 1.

FIG. 2 illustrates one possible example of the print ribbon 20. However, other configurations of the print ribbon 20 are possible. The print ribbon 20 includes a carrier film 50, and a repeating sequence of panels of thermally transferrable material with each sequence of panels including a cyan (C) color panel **52*a*, a magenta (M) color panel 52*b*, a yellow (Y) color panel 52*c*, and one or more black (K) color panels 52*d*. The example depicted in FIG. 2 includes two of the K panels 52*d* although a single K panel 52*d* is possible. The material forming the color panels can be ink, dyes, or other colorant material. Each sequence of panels further includes a peel-off panel 52*e*** of adhesive material. Each sequence of panels can optionally include a panel of inhibitor (I) material and possibly other panels known in the art.

In another embodiment, the retransfer print station 10 can include separate ribbons for each color to be printed along with a separate ribbon containing the adhesive material for peel-off. In this embodiment, separate print heads can be provided for each color to be printed and a print head for printing the peel-off adhesive material. In still another embodiment, the color material can be applied via drop-on-demand printing using one or more drop-on-demand print heads of the print station, while the peel-off adhesive material is thermally applied from a ribbon using a thermal print head.

Figure 3:
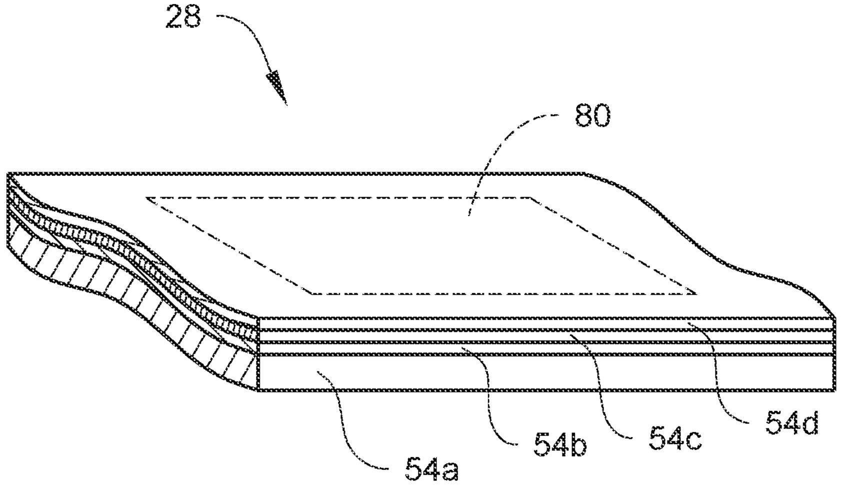
FIG. 3 illustrates an example of a retransfer film that can be used with the retransfer print station of FIG. 1.

FIG. 3 illustrates one possible example of the retransfer film 28. However, other configurations of the retransfer film 28 are possible. In this example, the retransfer film 28 is depicted as including a carrier film **54*a*, a release layer 54*b***

(also referred to as a peeling layer), a transferrable protective layer 54*c*, and a transferrable print receptive layer 54*d*. The thicknesses of the layers in FIG. 3 are exaggerated in order to better depict the concepts of the retransfer film 28. The carrier film 54*a* supports the layers 54*b*, 54*c*, 54*d*. The release layer 54*b* facilitates release of the layers 54*c*, 54*d* from the carrier film 54*a*. The protective layer 54*c* forms a protective layer over printing on the print receptive layer 54*d* when the print receptive layer 54*d* and the protective layer 54*c* are transferred to the card. The print receptive layer 54*d* is a material that is suitable for receiving color material, for example from the print ribbon 20, to form the printing on the retransfer film 28. The construction and operation of the carrier film 54*a* and the layers 54*b-d* are well known in the art.

Figure 4A:
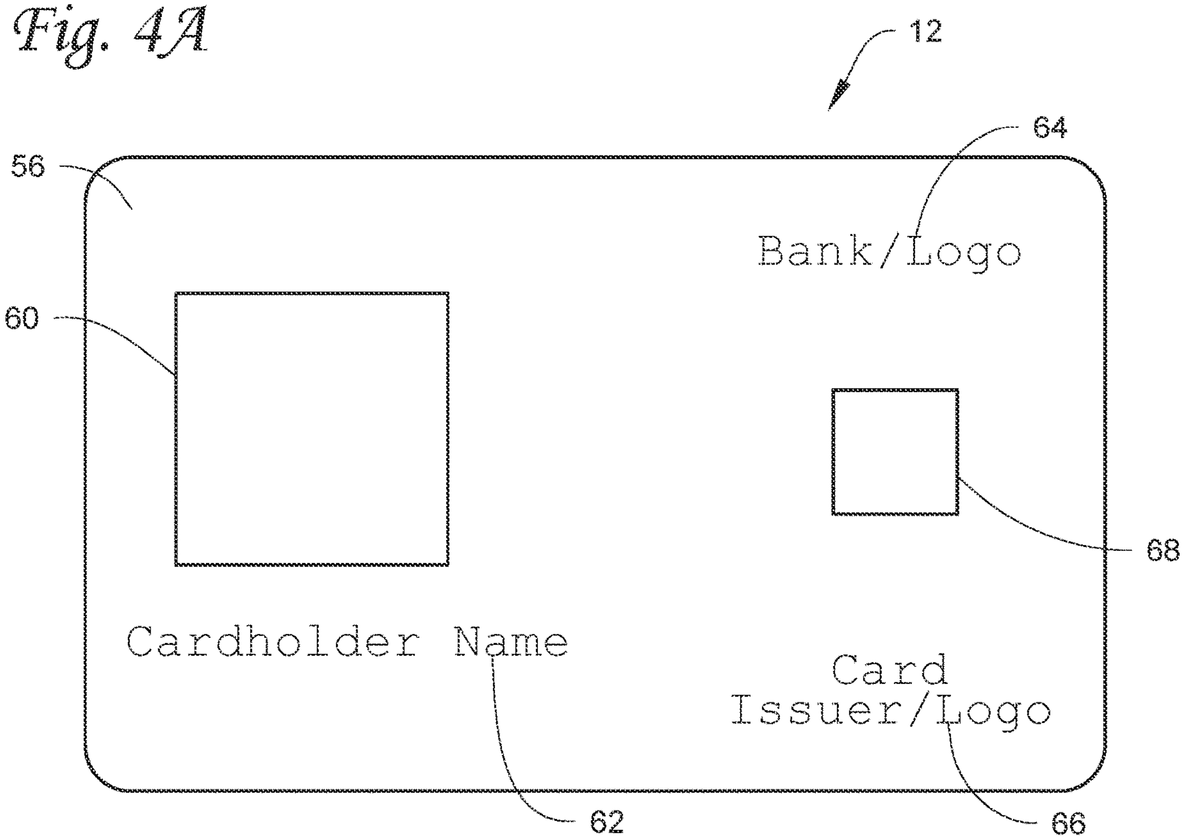
FIG. 4A is a view of an example of a front surface of a personalized credential in the form of a plastic card.
Figure 4B:
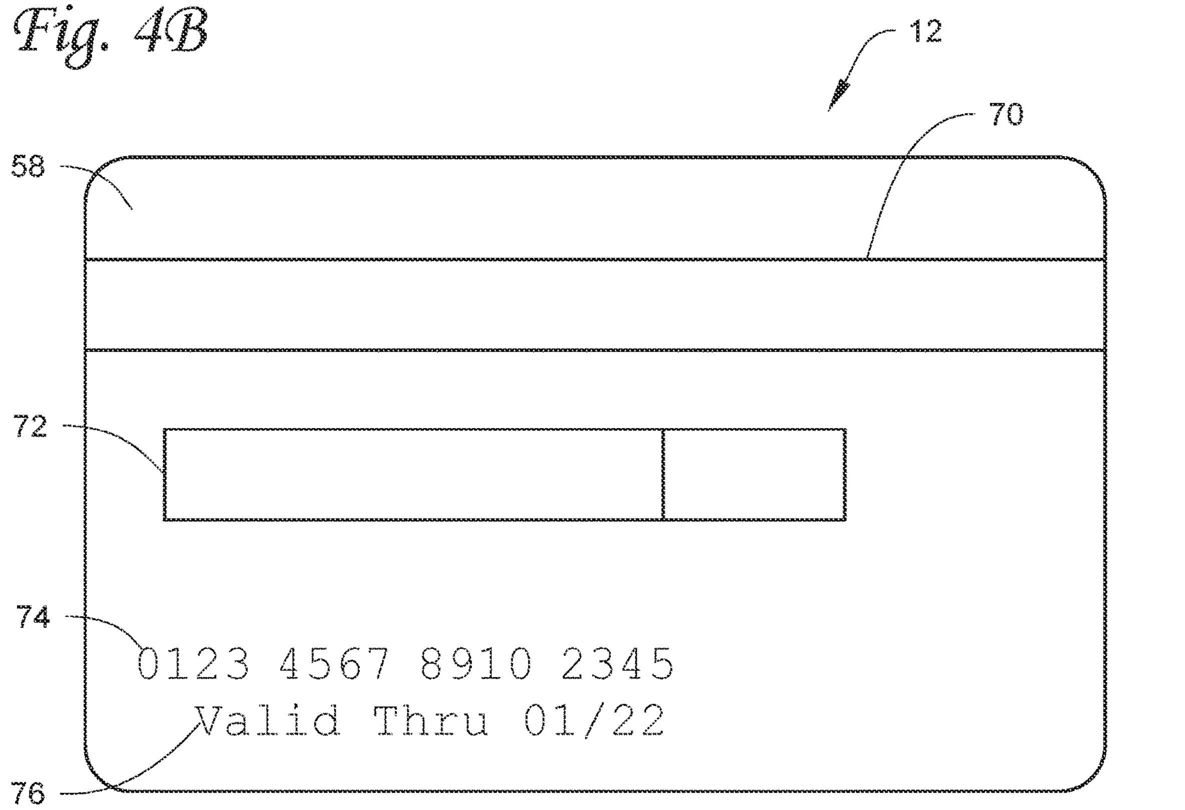
FIG. 4B is a view of an example of a rear surface of a personalized credential in the form of a plastic card.

FIGS. 4A and 4B illustrate an example of the plastic card 12. In this example, the card 12 is shown to include a front or first surface 56 (FIG. 4A) and a rear, back or second surface 58 (FIG. 4B) opposite the front surface 56. The card 12 may be printed on one side only (referred to as simplex printing), for example on the front surface 56 or the rear surface 58, or printed on both sides (referred to as duplex printing), for example on each of the front surface 56 and the rear surface 58.

Many possible layouts for the front surface 56 are possible. For example, the front surface 56 can include a horizontal card layout, a vertical card layout, and other known layout configurations and orientations. In the illustrated example in FIG. 4A, the front surface 56 can include various printed cardholder data such as a printed portrait image 60, the cardholder name 62, and account information such as account number, expiration date and the like. The front surface 56 can also include other printed data such as printed information 64 of the entity that issued the card 12, such as the corporate name and/or logo of the issuing bank (for example, STATE BANK), and/or printed information 66 of the card brand name (for example, VISA®, MASTERCARD®, DISCOVER®, etc.). The front surface 56 may also include a contact or contactless integrated circuit chip 68 that can store various data relating to the card 12 such as an account number and/or name of the cardholder.

Referring to FIG. 4B, many possible layouts for the rear surface 58 are possible which may or may not have a similar layout as the front surface 56. For example, the rear surface 58 can include a horizontal card layout, a vertical card layout, and other known layout configurations and orientations. In the illustrated example in FIG. 4B, the rear surface 58 can include a magnetic strip 70 that stores various data relating to the card 12 such as an account number or name of the cardholder, a signature panel 72 that provides a place for the cardholder to sign their name, and a hologram. The magnetic strip 70, the signature panel 72, and the hologram are conventional elements found on many plastic cards. The rear surface 58 can also include printed personal data that is unique to or assigned specifically to the cardholder. For example, an account number 74 assigned to the cardholder, the name of the cardholder, and a card expiration date 76 can be printed on the rear surface 58. Other personal cardholder data may also be printed on the rear surface 58, such as an image of the face of the cardholder. Non-personal data such as the name of the issuing bank, contact information to contact the issuing bank, and the like, can also be printed on the rear surface 58.

On the card 12, the integrated circuit chip 68, the magnetic strip 70, and the signature panel 72 are examples of areas on the card 12 that one may decide should not be covered with the transferrable print receptive material 54*d* and the protective material 54*c* of the retransfer film 28 (FIG. 3) since the materials may interfere with the operation of the chip 68, the magnetic strip 70 and the signature panel 72. To prevent covering of any one or more of these areas on the card, the transferrable print receptive material 54*d* and the protective material 54*c* are peeled-off of the retransfer film 28 at the location(s) corresponding to the area(s) of the card not to be covered prior to transferring the printed image to the card.

Figure 5:
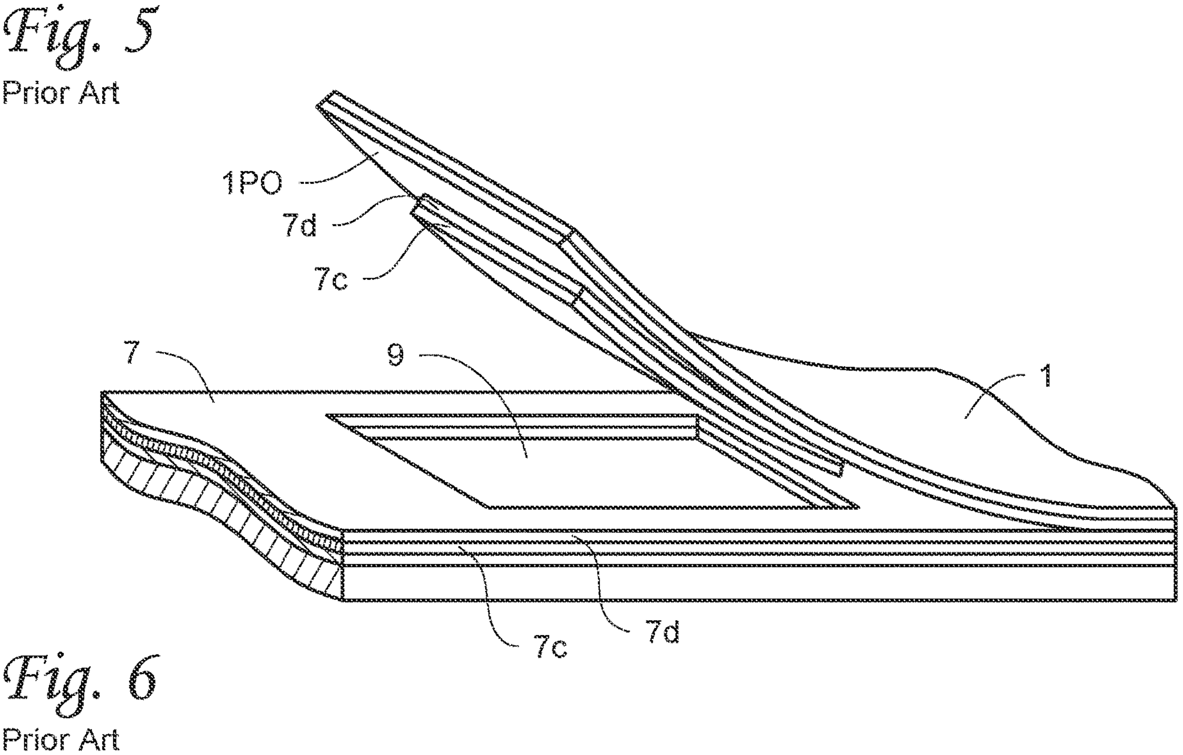
Fig. 5 Prior Art
FIG. 5 illustrates an example of a prior art method of a print ribbon peeling print receptive material from a retransfer film.
Figure 6:
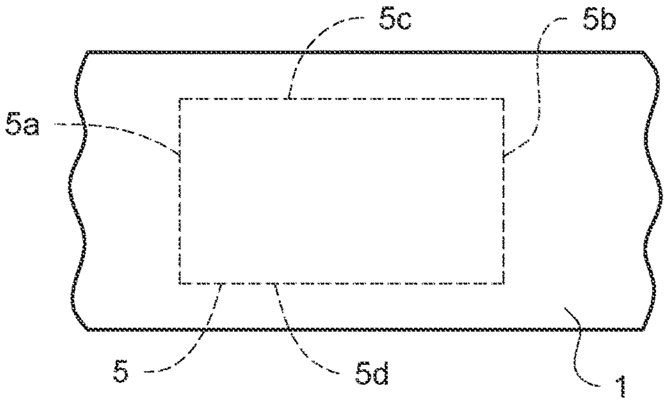
Fig. 6 Prior Art
FIG. 6 depicts an example of a conventional outline of heat applied to a peel-off area of a print ribbon.

FIGS. 5-6 illustrate an example of a known peel-off process. After printing the image on the print receptive layer 7*d* of the retransfer film 7, the peel-off panel 1PO of the print ribbon 1 is adhered to the print receptive layer 7*d* by the print head in a desired pattern corresponding in shape to the location on the card not to be covered by the print receptive layer 7*d* or the protective layer 7*c*. For example, FIG. 6 depicts an outline 5 of an area of the print ribbon 1 to which heat is applied by the print head to adhere the peel-off panel 1PO (FIG. 5) to the print receptive layer 7*d* of the retransfer film 7 (FIG. 5), with the outline 5 corresponding to the shape of the area of the print receptive layer 7*d* and the protective layer 7*c* to be removed from the retransfer film 7. Returning to FIG. 5, the print ribbon 1 is then peeled-away from the retransfer film 7 which peels-away the print receptive layer 7*d* and the protective layer 7*c* corresponding in area to the outline 5, forming a void 9 in the retransfer film 7 that corresponds in location to the location on the card not to be covered by the print receptive layer 7*d* and the protective layer 7*c*.

Figure 7:
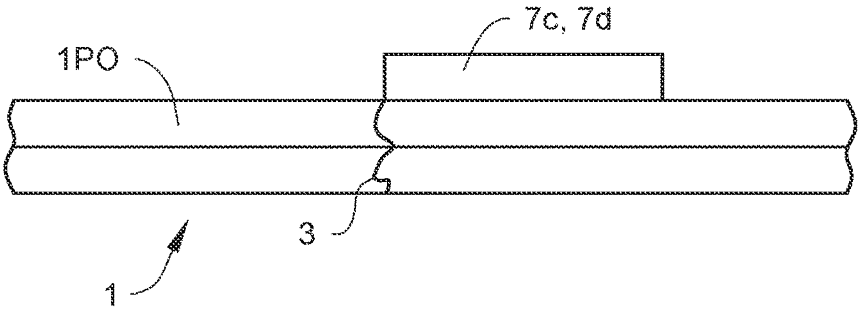
Fig. 7 Prior Art
FIG. 7 depicts an example of tears or holes that can occur in conventional print ribbons using the conventional peel-off area of FIG. 6.

As depicted in FIG. 6, the heating pattern used to adhere the peel-off panel 1PO (FIG. 5) to the print receptive layer 7*d* of the retransfer film 7 is typically linear with a linear leading edge 5*a*, a linear trailing edge 5*b* and linear sides 5*c*, 5*d*. However, referring to FIG. 7, using a linear heating pattern, especially at the leading edge 5*a* and the trailing edge 5*b* like in FIG. 6, stressed or weakened areas 3 are created at the separation line(s) which can cause a tear to initiate in the weakened area of the print ribbon 1.

As described in further detail below with respect to FIGS. 8-11, the techniques developed by the Applicant help to improve the peel-off process and help to manage mechanical and thermal stresses and eliminates tears that may occur in the print ribbon when the print receptive material is peeled from the retransfer film by the print ribbon. For example, in one embodiment, the adhesive material of the peel-off panel is adhered to the print receptive material along a non-straight, non-linear leading edge, along a non-straight, non-linear trailing edge, or along both a non-straight, non-linear leading edge and a non-straight, non-linear trailing edge.

Referring back initially to FIG. 3, an image canvas 80 is depicted in broken lines on the retransfer film 28. The image canvas 80 denotes the region or area on the retransfer film 28 that is printed on. In actual practice, the broken lines will not actually be printed. The image canvas 80 has a shape that mimics, and a size that is larger than the size of, the surface of the card to which the transferrable printing receptive layer 54*d* bearing the printing is to be transferred. A sub-region or sub-area within the image canvas 80 will be transferred onto the card surface, with a margin or buffer zone of printing being provided between the perimeter of the image canvas 80 and the sub-region to allow some tolerance in the printing process so that if there are slight inaccuracies in aligning the card surface with the sub-region at the transfer station, some of the printing in the margin will transfer to the card surface. Further information on an image canvas used in retransfer printing is disclosed in U.S. Pat. No. 10,828,885 the entire contents of which are incorporated herein by reference.

Data is printed within the image canvas 80 by aligning one or more of the panels 52*a-d* of the thermally transferrable color material on the print ribbon 20 with the image canvas 80 and transferring the thermally transferrable color material from the panel(s) 52*a-d* onto the transferrable print receptive material within at least a portion of the image canvas 80 using the thermal print head. Print data as used herein and in the claims refers to the types of data discussed with respect to FIGS. 4A and 4B including, but not limited to, the portrait image 60, the cardholder name 62, account information such as account number 74, expiration date 76 and the like, the printed information 64, the printed information 66, and other data printed using the print ribbon 20. Print data can also include general card graphics that may or may not be specific to the intended card holder.

Figure 8:
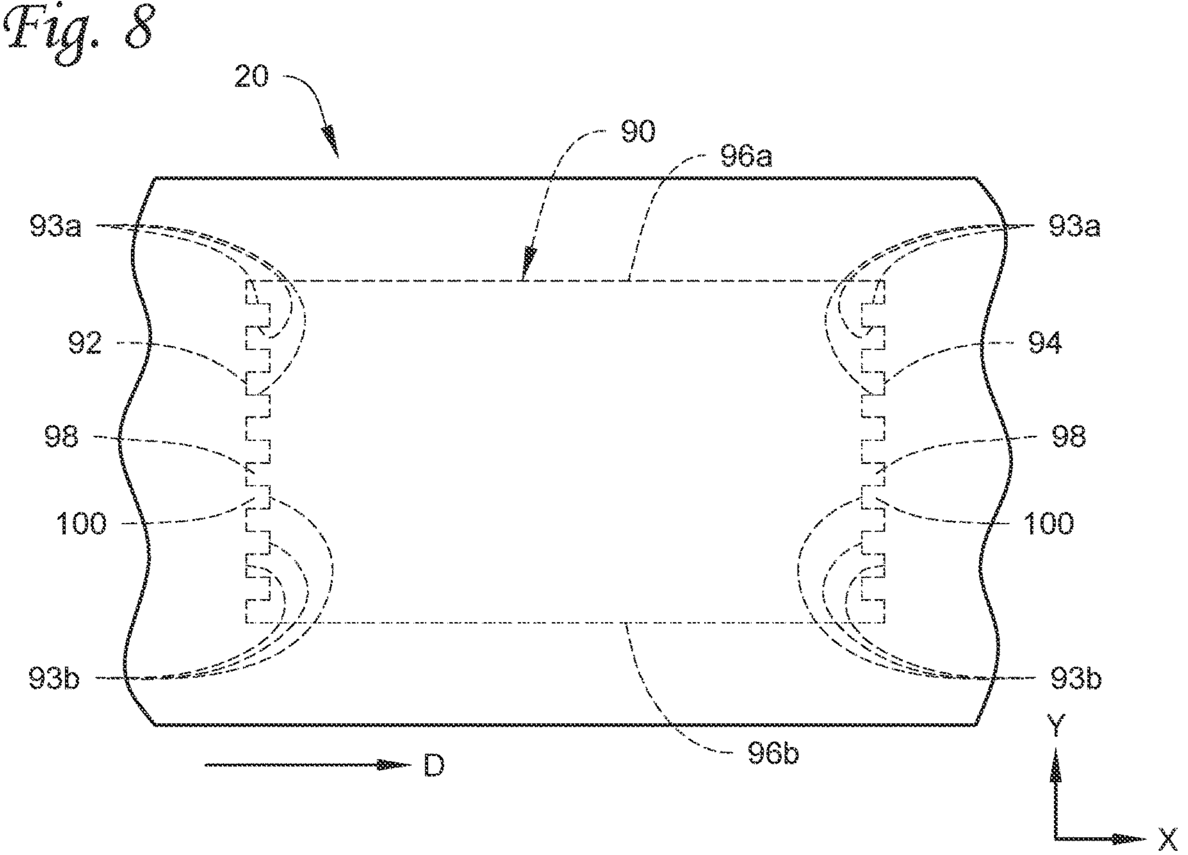
FIG. 8 depicts an example of an outline of heat applied to a peel-off area of the print ribbon described herein.

FIG. 8 illustrates an example of an outline 90 of an area of the print ribbon 20 within the image canvas 80 (FIG. 3) to which heat is applied by the print head to adhere the adhesive material of the peel-off panel 52*e* (FIG. 2) to the print receptive layer of the retransfer film 28 (FIG. 3). The outline 90 generally corresponds in shape to the area of the print receptive layer and the protective layer of the retransfer film 28 to be removed from the retransfer film 28 prior to transferring the print receptive layer bearing the printed image to the card surface. The outline 90 also generally corresponds in shape to the area on the card surface that is not to be covered by the print receptive layer and the protective layer after transferring the printed image of the image canvas 80 to the card surface. The outline 90 can correspond in shape to any portion of the card surface. For example, the outline 90 can correspond in shape to the signature panel 72 and/or to the magnetic strip 70 on the rear surface 58, or to the integrated circuit chip 68 on the front surface 56.

The arrow D in FIG. 8 illustrates the direction of relative movement between the print ribbon 20 and the print head (not shown) during the adhering process. As seen in FIG. 8, the print head is heated during adhering of the adhesive material of the peel-off panel 52*e* (FIG. 2) to the print receptive layer of the retransfer film 28 (FIG. 3) so that the outline 90 has a non-straight, non-linear leading edge 92. Alternatively, or additionally, the print head may be heated during adhering of the adhesive material of the peel-off panel 52*e* (FIG. 2) to the print receptive layer of the retransfer film 28 (FIG. 3) so that the outline 90 has a non-straight, non-linear trailing edge 94. The outline 90 may have straight side edges 96*a*, 96*b* that extend between and interconnect the leading edge 92 and the trailing edge 94. The side edges 96*a*, 96*b* are parallel to one another. In other embodiments, the side edges 96*a*, 96*b* may be non-straight, for example having a non-linear repeating or random pattern like the leading edge 92 and the trailing edge 94, and non-parallel to one another. The outline 90 depicted in FIG. 8, including the leading edge 92, the trailing edge 94, and the side edges 96*a*, 96*b*, is an example only and other shapes and geometries for the leading edge 92, the trailing edge 94, and the side edges 96*a*, 96*b* are possible.

Figure 9:
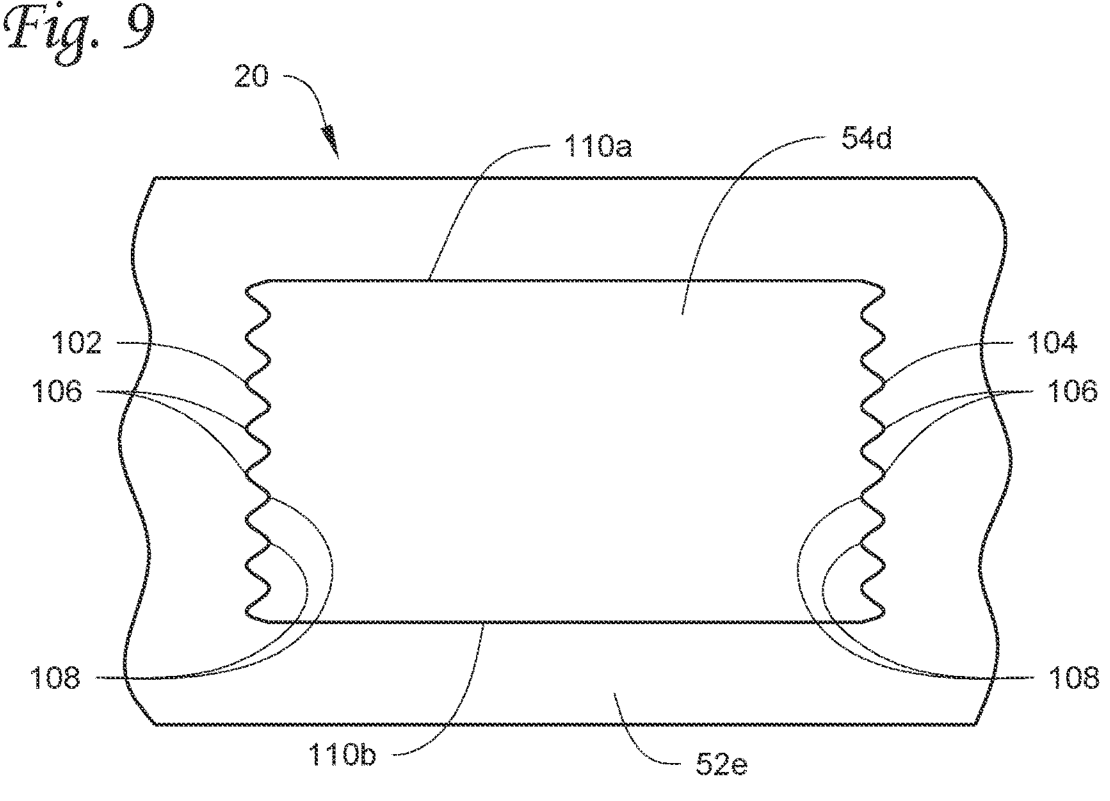
FIG. 9 depicts the peel-off panel of the print ribbon described herein with an adhered portion of the print receptive material peeled from the retransfer film.
Figure 10:
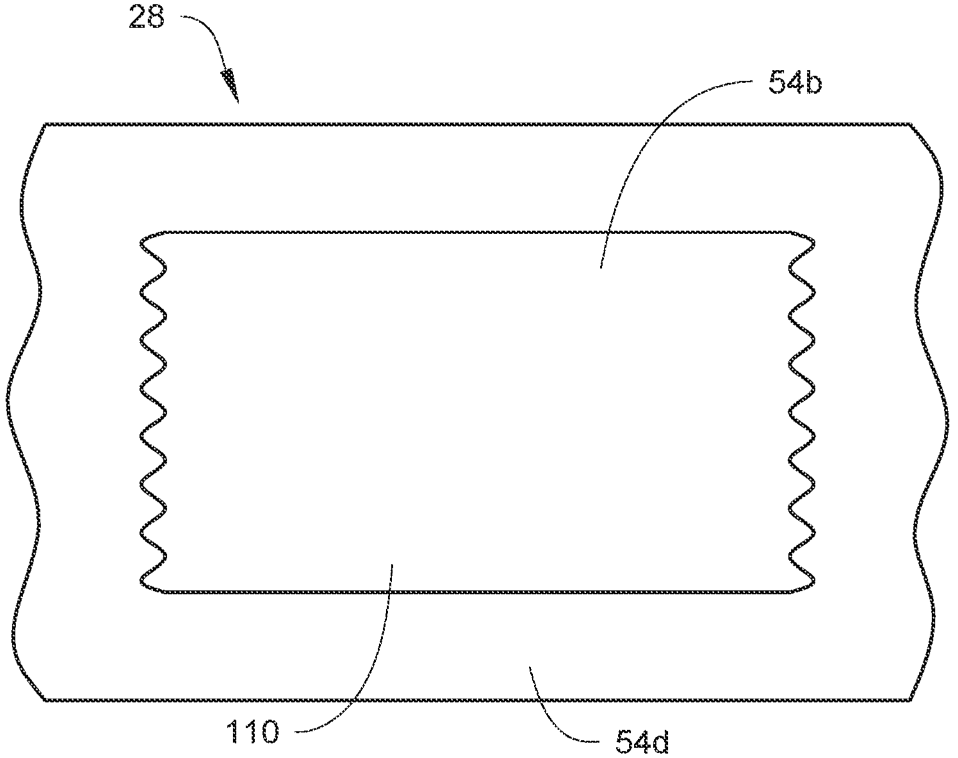
FIG. 10 depicts the retransfer film with the void area created by peeling away a portion of the print receptive material.

The non-linear leading edge 92 and/or the non-linear trailing edge 94 may have a non-linear repeating or random pattern. The non-linear repeating or random pattern can be any pattern that facilitates separation and minimizes or eliminates stressed or weakened areas at the separation line(s). The pattern used for the non-linear leading edge 92 and/or the non-linear trailing edge 94, as well as the actual separation pattern that results from the separation as discussed below with respect to FIGS. 9 and 10 are factors to consider when selecting the non-linear repeating or random pattern. The pattern depicted in FIG. 8 may be referred to as a toothed pattern, a crenellated pattern, a saw-tooth pattern, or a pattern with a plurality of projections 98 separated from one another by indentations 100. However, other patterns for the leading edge 92 and/or the trailing edge 94 are possible. The leading edge 92 may have a pattern that is the same as the trailing edge 94, or the leading edge 92 may have a pattern that differs from the pattern of the trailing edge 94. The pattern may extend along the entire length of the leading edge 92 as depicted in FIG. 8, or the pattern may extend along only a portion of the length of the leading edge 92. Similarly, the pattern may extend along the entire length of the trailing edge 94 as depicted in FIG. 8, or the pattern may extend along only a portion of the length of the trailing edge 94.

With respect to the pattern depicted in FIG. 8, for the non-linear leading edge 92 and/or the non-linear trailing edge 94, the pattern includes legs 93*a* that extend in an x-direction and legs 93*b* that extend in a y-direction. Each leg 93*a* of the pattern that extends in the x-direction (also referred to as a transport direction or an axial direction) can be 6 to 10 pixels in length, or 8 pixels in length. Similarly, each leg 93*b* that extends in the y-direction (which is perpendicular to the x-direction) can be 6 to 10 pixels in length, or 8 pixels in length.

Figure 14B:
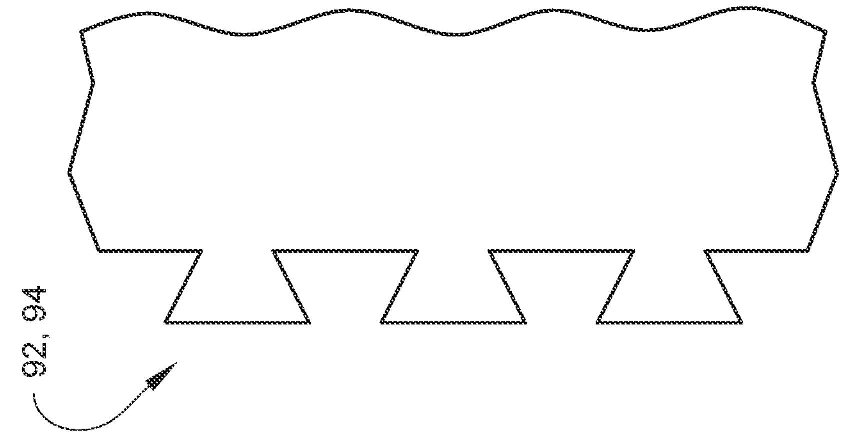
FIGS. 14A and 14B illustrate additional examples of patterns that can be used for the heat outline at the leading edge and/or the trailing edge.
Figure 14A:
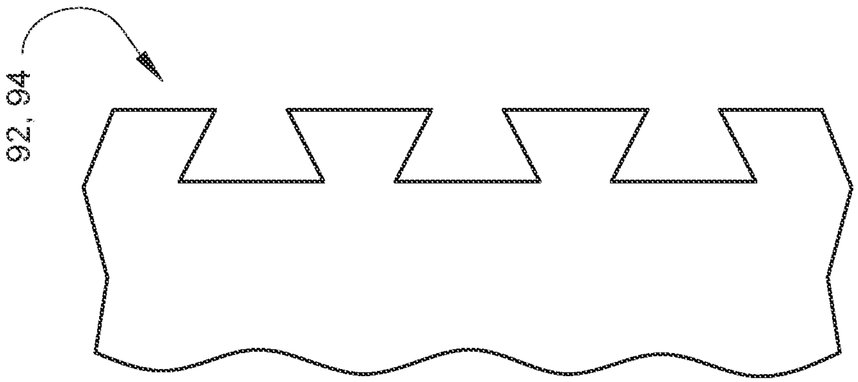

FIGS. 14A and 14B illustrate additional examples of patterns that can be used for the leading edge 92 and/or the trailing edge 94. FIG. 14A illustrates a portion of the pattern which is shown as having a female dovetail shape. FIG. 14B illustrates a portion of the pattern which is shown as having a male dovetail shape. In an embodiment, the patterns in FIGS. 14A and 14B can be used together with the pattern illustrated in FIG. 8 or with other patterns. For example, a portion of the leading edge 92 could have the pattern illustrated in FIG. 8 with another portion of the leading edge 92 having the pattern in FIG. 14A or FIG. 14B. Alternatively, the leading edge 92 could have the pattern illustrated in FIG. 8, FIG. 14A or FIG. 14B, while the trailing edge 94 has the pattern illustrated in FIG. 8, FIG. 14A, or FIG. 14B different from the pattern used for the leading edge 92.

Figure 15:
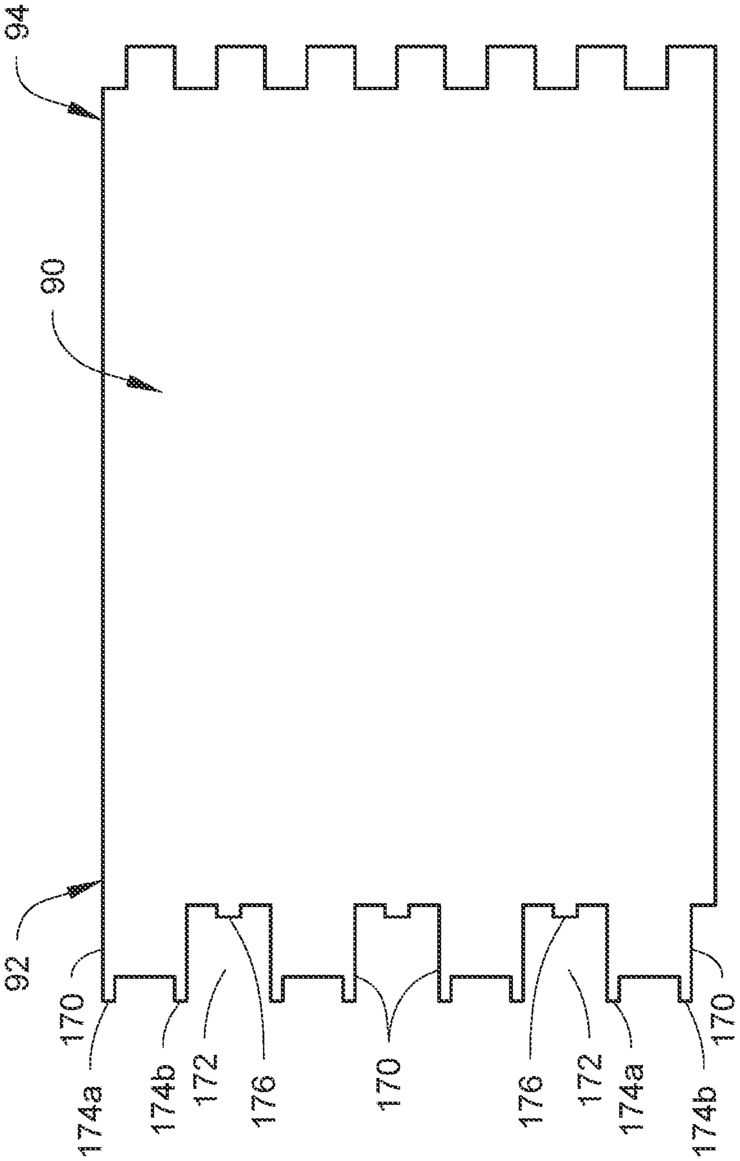
FIG. 15 depicts an additional example of patterns that can be used for the heat outline at the leading edge and the trailing edge.

FIG. 15 depicts another example of patterns that can be used for the leading edge 92 and the trailing edge 94. In this example, the leading edge 92 and the trailing edge 94 of the same outline 90 are depicted as having different patterns from each other. For example, the leading edge 92 is depicted as having a plurality of major projections 170 separated by indentations 172, with each major projection 170 having a pair of minor projections 174*a*, 174*b* extending therefrom. In addition, within each indentation 172, a minor projection 176 extends upwardly into the indentation 172. However, other patterns for the leading edge 92 are possible. The trailing edge 94 pattern is depicted as being the same as the pattern depicted in FIG. 8 although other patterns are possible.

FIG. 9 depicts one of the peel-off panels 52*e* of the print ribbon 20 described herein with a portion of the print receptive material 54*d* (and the transferrable protective layer (not shown) underlying the print receptive material 54*d*) peeled from the retransfer film based on the heating outline 90 depicted in FIG. 8. The leading edge 92 and/or the trailing edge 94 of the heating outline 90 has a non-linear repeating or random pattern. However, as shown in FIG. 9, the print receptive material 54*d* and the transferrable protective layer will peel or separate along a leading edge 102 and a trailing edge 104 with a pattern that differs from the pattern of the leading edge 92 and the trailing edge 94 due to cooling that occurs prior to peeling. The pattern of the leading edge 102 and the trailing edge 104 is a non-linear pattern that is similar to the pattern of the leading edge 102 and the trailing edge 104. The pattern may also be referred to as a non-linear repeating or random pattern. In the example depicted in FIG. 9, the pattern of the leading edge 102 and the trailing edge 104 is more curved, with rounded projections 106 and rounded valleys 108. The peeled away portion of the print receptive material 54*d* and the transferrable protective layer has side edges 110*a*, 110*b* that generally match the side edges 96*a*, 96*b*. For example, in FIG. 9, the side edges 110*a*, 110*b* are parallel to one another, matching the sides edges 96*a*, 96*b* in FIG. 8. In other embodiments, the side edges 110*a*, 110*b* may be non-straight if the side edges 96*a*, 96*b* are non-straight.

FIG. 10 depicts the retransfer film 28 with a void area 110 that is created by peeling away the portion of the print receptive material 54*d* and the transferrable protective layer from the retransfer film 28. The release layer 54*b* is visible in the void area 110, with the release layer 54*b* being exposed due to peeling away a portion of the print receptive material 54*d* and the transferrable protective layer from the retransfer film 28. The void area 110 has a shape that is the opposite of the shape of the portion of the print receptive material 54*d* depicted in FIG. 9.

Figure 11:
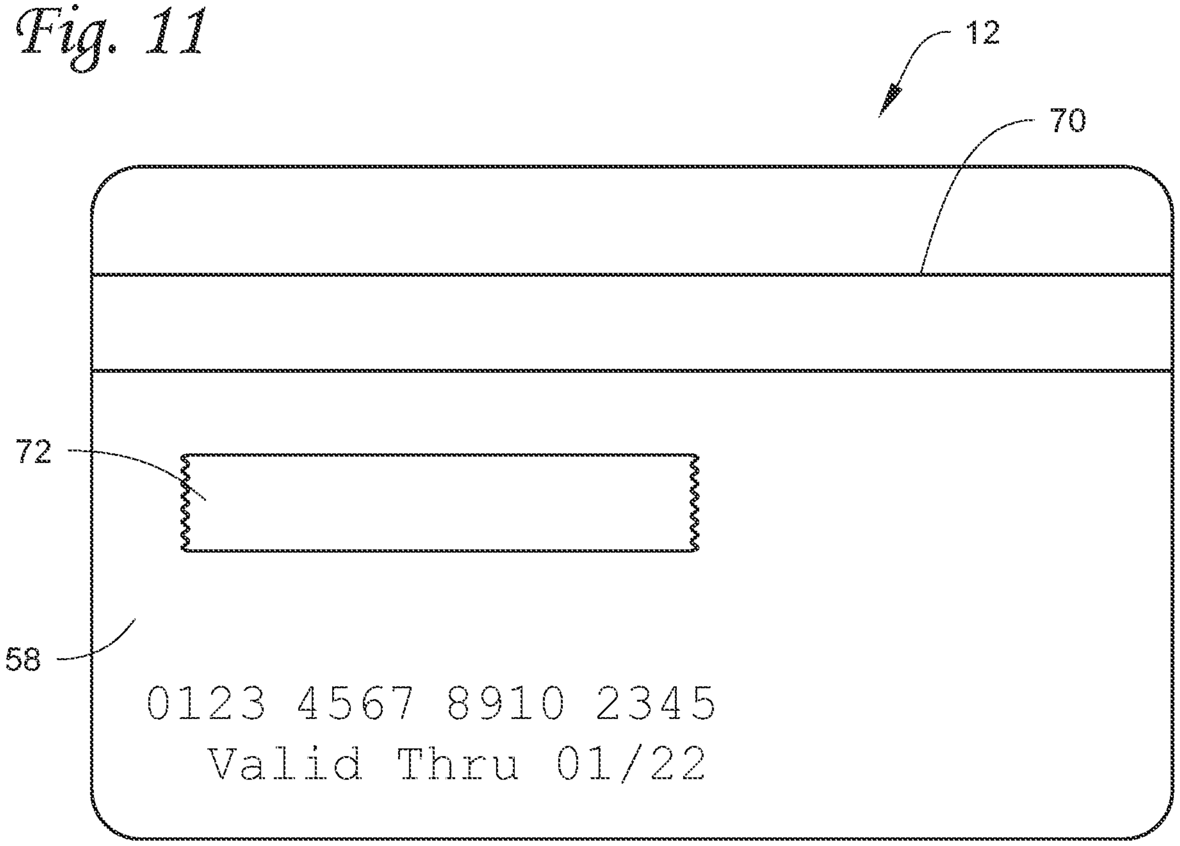
FIG. 11 depicts an example of a rear surface of a plastic card after retransfer printing with the void area of the transfer film located over a signature panel.

FIG. 11 depicts an example of the back surface 58 of the card 12 after retransfer printing described herein where the portion of the print receptive material 54*d* and the transferrable protective layer that have been peeled away from the retransfer film 28 corresponds in location to the signature panel 72. In other words, the void area 110 described with respect to FIG. 10 is located on the retransfer film at a location corresponding to the signature panel 72. Therefore, the signature panel 72 is not covered by the print receptive material or the transferrable protective layer. A similar void area can be located at a location corresponding to the magnetic strip 70 so that the magnetic strip 70 is not covered by the print receptive material or the transferrable protective layer. The result is that the print receptive material and the transferrable protective layer covers a portion of the back surface 58 (or the front surface) and a first portion of the back surface 58 (for example, corresponding to the location of the signature panel 72 and/or corresponding to the location of the magnetic strip 70, and/or corresponding to the location of the integrated circuit chip on the front surface depicted in FIG. 4A) is not covered by the print receptive material and the transferrable protective layer. The first portion that is not covered by the print receptive material and the transferrable protective layer has a border and at least one edge of the border (in the example depicted in FIG. 11, both the leading edge and the trailing edge of the border) has a non-linear repeating or random pattern that substantially corresponds to the non-linear repeating or random pattern of the leading edge and/or the trailing edge of the void area 110 depicted in FIG. 10. The card depicted in FIG. 11 would have two portions, namely the locations of the signature panel 72 and the magnetic trip 70, on the back surface 58 that are not covered by the print receptive material and the transferrable protective layer.

Figure 12:
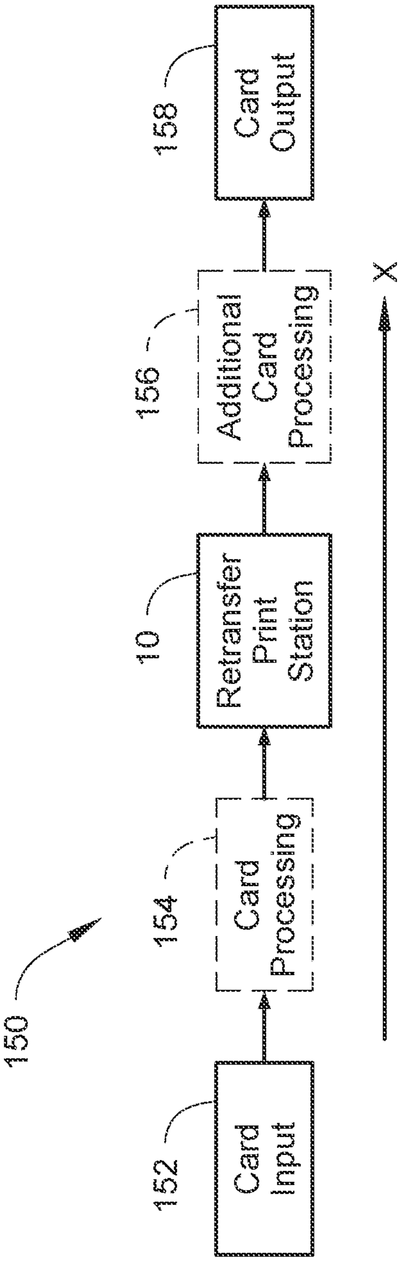
FIG. 12 depicts an example of a personalized credential processing system that can use the retransfer print station described herein.
Figure 13:
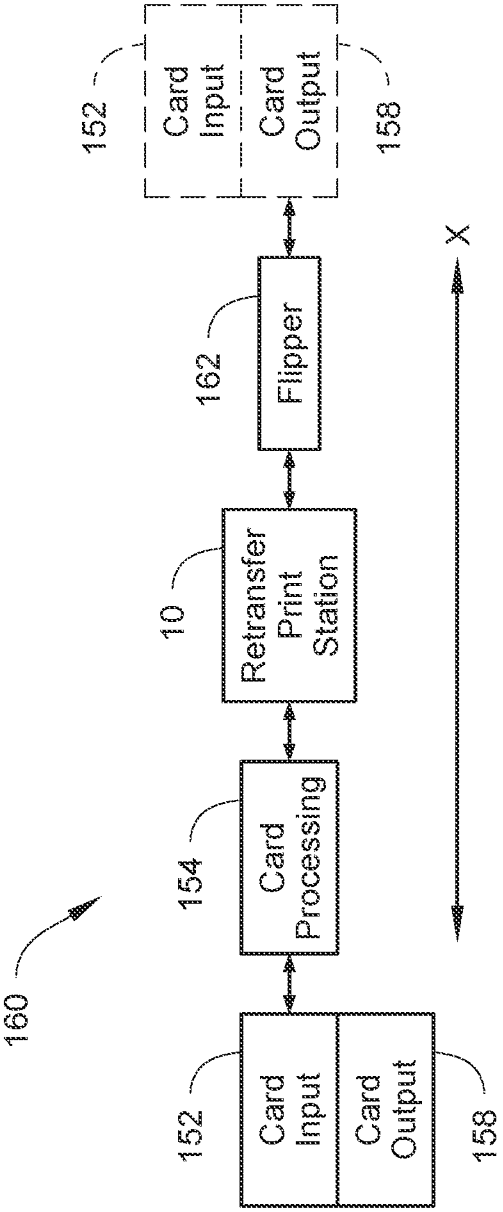
FIG. 13 depicts another example of a personalized credential processing system that can use the retransfer print station described herein.

FIGS. 12 and 13 illustrate two examples of personalized credential processing systems that can be used to produce personalized credentials using the retransfer print station 10 described herein.

As used herein, the term "processing" (or the like) as used throughout the specification and claims, unless indicated otherwise, is intended to encompass operations performed on a personalized credential, such as a personalized card or passport, that includes operations that result in personalizing the credential as well as operations that do not result in personalizing the credential. An example of a processing operation that personalizes the credential is printing the credential holder's image or name on the credential. An example of a processing operation that does not personalize the credential is applying a laminate to the credential or printing non-credential holder graphics on the credential. The term "personalize" is often used in the personalized credential industry to refer to credentials that undergo both personalization processing operations and non-personalization processing operations.

FIG. 12 is a schematic depiction of one embodiment of a large volume batch production credential processing system 150 that can be used to process plastic identification cards (and passports) described herein. The credential processing system 150 is configured to process multiple credentials at the same time, with the credentials being processed in sequence, with the credentials proceeding generally along a transport direction/transport path X. The type of system 150 depicted in FIG. 12 is often referred to as a central issuance processing system that processes credentials in high volumes, for example on the order of high hundreds or thousands per hour, and employs multiple processing stations or modules to process multiple credentials at the same time to reduce the overall per credential processing time. Examples of such large volume credential processing machines include the MX and MPR family of central issuance processing machines available from Entrust Corporation of Shakopee, Minnesota. Other examples of central issuance processing machines are disclosed in U.S. Pat. Nos. 4,825,054, 5,266,781, 6,783,067, and 6,902,107, all of which are incorporated herein by reference in their entirety.

For sake of convenience, the system 150 will be described and illustrated as processing plastic cards. The system 150 in FIG. 12 can include a card input 152, one or more optional card processing stations 154 downstream from the card input 152, the retransfer print station 10, one or more optional additional card processing stations 156, and a card output 158. The system 150 can include additional processing stations as would be understood by persons of ordinary skill in the art.

The card input 152 can be configured to hold a plurality of plastic cards waiting to be processed and that mechanically feeds the cards one by one into the system 150 using a suitable card feeder. In one embodiment, the card input 152 can be an input hopper. In another embodiment, the card input 152 can be an input slot through which individual cards are manually or automatically fed for processing. The cards are initially introduced into the one or more optional card processing stations 154 if they are present in the system. The stations 154, if present, can include a chip testing/programming device that is configured to perform contact or contactless testing of an integrated circuit chip on each card to test the functionality of the chip, as well as program the chip. Testing the functionality of the chip can include reading data from and/or writing data to the chip. In one embodiment, the chip testing/programming device can be configured to simultaneously program the chips on a plurality of cards. The construction and operation of chip testing/programming devices in document processing systems is well known in the art. The stations 14 can also include a magnetic strip read/write testing device that is configured to read data from and/or encode data on a magnetic strip on each card (if the cards include a magnetic strip). The construction and operation of magnetic strip read/write testing devices in document processing systems is well known in the art.

The retransfer print station 10 is configured and operates as described above. In an embodiment, an optional curing mechanism or station can be provided that is configured to generate and apply radiation, such as ultraviolet radiation or other radiation, to radiation curable material, such as radiation curable topcoat material, applied to the card in the print station 10 to cure the radiation curable material.

The one or more additional card processing stations 156 can be stations that are configured to perform any type of additional card processing. Examples of the additional card processing stations 156 include, but are not limited to, an embossing station having an embosser configured to emboss characters on the cards, an indent station having an indenter configured to indent one or more characters on the cards, a lamination station with a laminator configured to apply one or more laminates to the cards, a security station with a security feature applicator configured to apply one or more additional security features to one or more of the surfaces of the cards, and one or more card reorienting mechanisms/flippers configured to rotate or flip a card 180 degrees for processing on both sides of the cards.

The card output 158 can be configured to hold a plurality of cards after they have been processed. In this configuration, the card output 158 is often termed a card output hopper. The construction and operation of output hoppers is well known in the art. In another embodiment, the card output 158 can be an output slot.

FIG. 13 is a schematic depiction of another embodiment of a card processing system 160 that can be used to process plastic cards (or passports). In this embodiment, the card processing system 160 can be configured as a desktop card processing system that is typically designed for relatively smaller scale, individual card personalization in relatively small volumes, for example measured in tens or low hundreds per hour, often times with a single card being processed at any one time. These card processing machines are often termed desktop processing machines because they have a relatively small footprint intended to permit the processing machine to reside on a desktop. Many examples of desktop processing machines are known, such as the SIGMA™ and ARTISTA™ family of desktop card printers available from Entrust Corporation of Shakopee, Minnesota. Other examples of desktop processing machines are disclosed in U.S. Pat. Nos. 7,434,728 and 7,398,972, each of which is incorporated herein by reference in its entirety.

In FIG. 13, elements in the system 160 that are similar in construction or functionality to elements in the system 150 in FIG. 12 are referred to using the same reference numerals. In FIG. 13, the system 160 is illustrated as including the card input 152 and the card output 158 at one end of the system 160. In the type of system depicted in FIG. 13, the card input 152 and/or the card output 158 can be provided at other locations in the system 160. For example, in one embodiment, the card input 152 can be located at a position higher up in the system, for example at the top of the system above the transport path X between the ends of the system 160. In another embodiment as depicted in dashed lines in FIG. 13, the card input 152 and the card output 158 can be located at the opposite end of the system 160.

The one or more optional card processing stations 154 can be positioned in the system 160 as illustrated in FIG. 13. In an embodiment, a card flipper 1622 can be provided at the end of the system 160 that is configured to flip or rotate the card 180 degrees so that the card surface previously facing upward is now facing downward, and the card surface previously facing downward is now facing upward. The card is then transported in reverse back toward the retransfer print station 10 and the other processing stations for additional processing on the now upwardly facing card surface and ultimately transported to the output 158. If the card flipper 162 is not present, the card can simply be reversed in direction after printing is finished, and the card ultimately transported to the output 158.

In the systems 150, 160 in FIGS. 12 and 13, the cards can be transported throughout the systems 150, 160 and moved along the card transport path X by one or more suitable mechanical transport mechanisms (not shown). Mechanical transport mechanism(s) for transporting cards and passports in processing equipment of the type described herein are well known in the art. Examples of mechanical transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of transport mechanisms that could be used, as well as the construction and operation of such transport mechanisms.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A retransfer printing method on a personalized credential, comprising:

printing data within an image canvas of transferrable print receptive material on a retransfer film by aligning thermally transferrable color material on a ribbon with the image canvas and transferring thermally transferrable color material from the ribbon onto at least a portion of the transferrable print receptive material within the image canvas using a thermal print head;

after printing the data, aligning peel-off material on a ribbon with the image canvas of the transferrable print receptive material on the retransfer film, and adhering a portion of the peel-off material to the transferrable print receptive material along a heating outline within the image canvas using a thermal print head, the heating outline generally corresponds in shape to an area of the transferrable print receptive material to be removed from the retransfer film and generally corresponds in shape to an area on a surface of the personalized credential that is not to be covered by the transferrable print receptive material, wherein the heating outline has a leading edge with a non-straight, non-linear repeating or random pattern;

peeling the transferrable print receptive material within the area defined by the heating outline from the retransfer film thereby forming a void area in the transferrable print receptive material of the image canvas;

advancing the retransfer film and the printed data of the image canvas to a transfer station, and transferring a portion of the image canvas of the transferrable print receptive material bearing the printed data and the void area to the surface of the personalized credential with the void area over the area on the surface of the personalized credential.

2. The retransfer printing method of claim 1, wherein the heating outline has a trailing edge with a non-straight, non-linear repeating or random pattern.

3. The retransfer printing method of claim 2, wherein the heating outline has first and second side edges that extend between and interconnect the leading edge and the trailing edge, and the first and second side edges are parallel to one another.

4. The retransfer printing method of claim 1, wherein the non-straight, non-linear repeating or random pattern comprises a plurality of projections and indentations.

5. The retransfer printing method of claim 1, wherein the non-straight, non-linear repeating or random pattern comprises crenellations.

6. The retransfer printing method of claim 1, wherein the area on the surface of the personalized credential comprises a signature panel, and the void area is disposed over the signature panel.

7. The retransfer printing method of claim 1, wherein the area on the surface of the personalized credential comprises a magnetic strip, and the void area is disposed over the magnetic strip.

8. The retransfer printing method of claim 1, wherein the area on the surface of the personalized credential comprises an integrated circuit chip, and the void area is disposed over the integrated circuit chip.

9. A plastic card produced using the retransfer printing method of claim 1.

10. A retransfer print station of a personalized credential processing system, comprising:

a thermal print head;

a retransfer film having a layer of transferrable print receptive material;

a ribbon having a peel-off material;

a transfer station;

a controller that is programmed to control the thermal print head, the retransfer film, the ribbon, and the transfer station to:

align the peel-off material of the ribbon with an image canvas of the transferrable print receptive material of the retransfer film having printed data in the image canvas, and adhere a portion of the peel-off material to the transferrable print receptive material along a heating outline within the image canvas using the thermal print head, the heating outline generally corresponds in shape to an area of the transferrable print receptive material to be removed from the retransfer film and generally corresponds in shape to an area on a surface of the personalized credential that is not to be covered by the transferrable print receptive material, wherein the heating outline has a leading edge with a non-straight, non-linear repeating or random pattern;

peel the transferrable print receptive material within the area defined by the heating outline from the retransfer film thereby forming a void area in the transferrable print receptive material of the image canvas; and advance the retransfer film and the printed data of the image canvas to a transfer station, and transfer a portion of the image canvas of the transferrable print receptive material bearing the printed data and the void area to the surface of the personalized credential with the void area over the area on the surface of the personalized credential.

11. The retransfer print station of claim 10, wherein the heating outline has a trailing edge with a non-straight, non-linear repeating or random pattern.

12. The retransfer print station of claim 11, wherein the heating outline has first and second side edges that extend between and interconnect the leading edge and the trailing edge, and the first and second side edges are parallel to one another.

13. The retransfer print station of claim 10, wherein the non-straight, non-linear repeating or random pattern comprises a plurality of projections and indentations.

14. The retransfer print station of claim 10, wherein the non-straight, non-linear repeating or random pattern comprises crenellations.

15. The retransfer print station of claim 10, wherein the area on the surface of the personalized credential comprises a signature panel, and the void area is disposed over the signature panel.

16. The retransfer print station of claim 10, wherein the area on the surface of the personalized credential comprises a magnetic strip, and the void area is disposed over the magnetic strip.

17. The retransfer print station of claim 10, wherein the area on the surface of the personalized credential comprises an integrated circuit chip, and the void area is disposed over the integrated circuit chip.

* * * * *